United States Patent Office 3,489,796
Patented Jan. 13, 1970

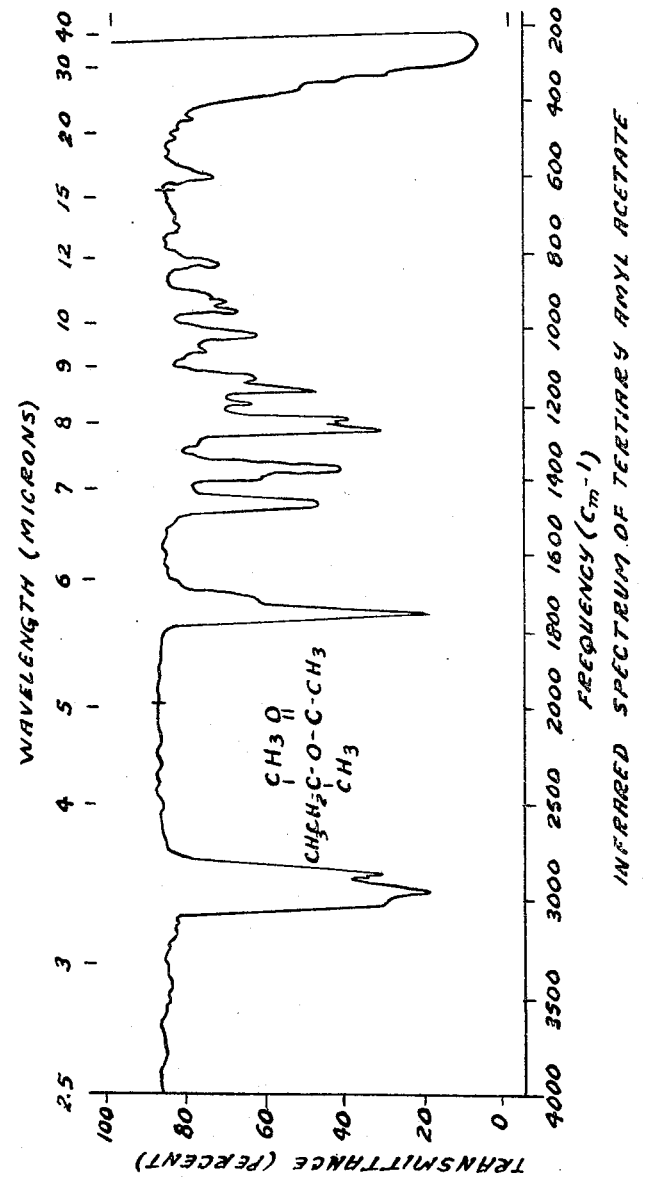

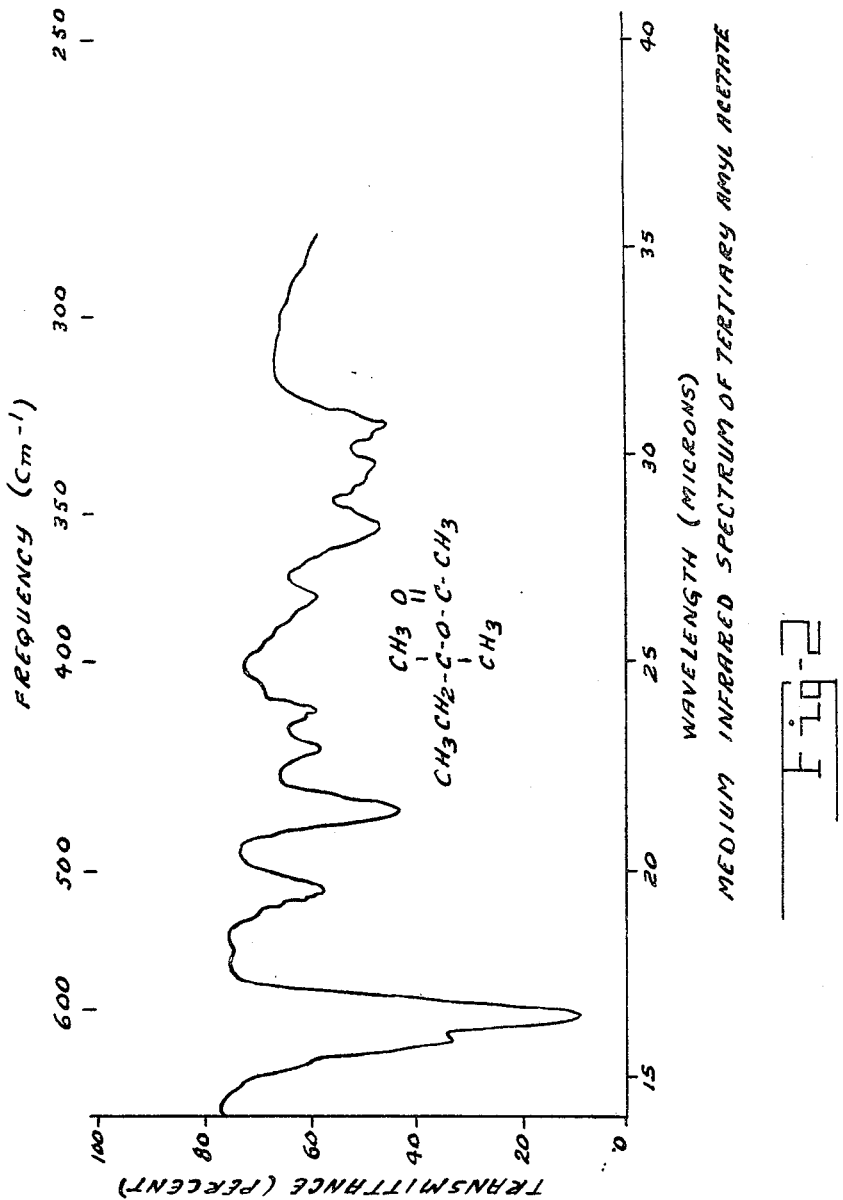

3,489,796
METHOD FOR MAKING HIGH PURITY AND HIGH YIELD TERTIARY-AMYL ACETATE
Khodabakhsh S. Mazdiyasni, 2343 E. Skyview, Dayton, Ohio 45432; Charles T. Lynch, 387 Cherrywood Drive, Fairborn, Ohio 45324; and Jonathan S. Smith II, 2607 Fairbanks Ave., Dayton, Ohio 45407
Filed June 20, 1966, Ser. No. 559,687
Int. Cl. C07c 69/14, 67/00
U.S. Cl. 260—488                    3 Claims

ABSTRACT OF THE DISCLOSURE

A method of preparing tertiary-amyl acetate from acetic anhydride and tertiary-amyl alcohol using hydrochloric acid as a catalyst. This method gives high purity tertiary-amyl acetate at yields in excess of 80% of theoretical.

---

The invention described herein may be manufactured and used by or for the United States Government for governmental purposes without the payment to any of us of any royalty thereon.

This invention relates to syntheses of improved tertiary esters of which tertiary-amyl acetate is representative, which are of a purity in the order of 99.99%, and to the herein disclosed process for making the esters in large yield in excess of 80% of the theoretical.

The tertiary esters here of interest are of the type RCOOR' where R is methyl, ethyl, propyl, isopropyl, butyl and amyl and R' is $CH_3$.

The high purity tertiary acetates are prepared by reacting tertiary-alkyl alcohol of which tertiary-amyl alcohol is representative with acetic anhydride in the presence of 0.01 mole per mole percent HCl (38%).

Prior methods for the preparation of tertiary acetates have been cumbersome, uneconomical in yield of products of low purity, such that the products are not sufficiently pure for subsequent organic ester exchange reaction without further processing and with a further marked reduction of yield. Illustrative examples of prior methods are disclosed by the patents, 3,031,495 and 2,476,052 and in the literature references Journal American Chemical Society 76:2266 and JACS 61:3357.

Other references of interest are:

Frankel, M. and Patai, S., Tables for Identification of Organic Compounds, p. 179, 2nd edition, The Chemical Rubber Co., Cleveland, 1964.

Beilstein, Handbuch Der Organischen Chemie, p. 142, 4th edition, volume 2, Apringer, Berlin, 1920.

The objects of the present invention are the provision of a new and improved relatively rapid process that is a direct and simplified route to tertiary ester products of high purity in relatively large yields and from which high purity oxides also are available.

Teritiary-amyl acetate made hereby provides the data presented in the accompanying drawing wherein:

FIG. 1 is an infrared spectrum of tertiary-amyl acetate; and

FIG. 2 is an infrared spectrum curve of the product made by the process that is disclosed herein.

When an unbalanced acid is esterified with a primary alcohol the yield of pure ester is usually high. However, alkyl groups attached to either the α carbon atom of the acid or the carbinol carbon atom of the alcohol exert a blocking effect, or steric hindrance, that may retard the reaction and cause the equilibrium to be less favorable to the ester. Thus, the rate of esterification of acetic acid with isopropyl alcohol is just half that of the acid with methanol or ethanol. The highly branched trimethyl acetic acid when heated with isobutyl alcohol at 155° C. for one hour gives only 8% of the ester, as compared with 33% for n-butyric acid.

The rate of esterification of t-butyl alcohol with acetic acid is slightly greater than the rate of reaction of methanol with the same acid. This is because the esterification of a tertiary alcohol proceeds by a mechanism different from that involved in the case of a primary or secondary alcohol. In the esterification of a tertiary alcohol with a carboxylic acid, the hydroxyl group of the alcohol is eliminated. The following mechanism appears to be applicable:

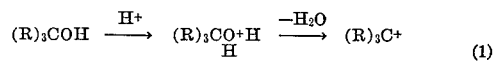

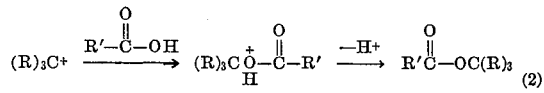

The product of initial addition of a proton is an oxonium ion that loses water to form a carbonium ion because of the combined electron releasing power of the attached alkyl groups. The carbonium ion combines with the acid to form a substituted oxonium ion that expels a proton to form the ester. The catalytic role of the proton is accounted for, and the differing behavior of the tertiary alcohols is interpreted as due to the inductive effect of the three alkyl groups in promoting formation of a carbonium ion. However, the hydrogen ion catalyzed reaction of an acid with an alcohol to give an ester is reversible, and the same equilibrium state can be reached starting with the products of the reaction, the ester and water. The formation of water if not removed immediately in the presence of excess acid (catalyst) promotes hydrolysis and the mechanism of reaction is as follows:

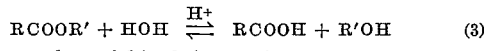

which causes low yield of the product.

The products made are useful as subsequent esterification reaction of transition metal alkoxides with tertiary esters such as tertiary amyl or tertiary butyl, etc, to a more volatile metal-organic as precursor materials in the preparation of fine powders, films, and coatings of the oxides.

The previously available methods of making primary and secondary esters by reacting acetic acid with alcohol in the presence of a 3% acid catalyst do not work when tertiary-amyl alcohols are employed. The reaction in the case of tertiary-amyl alcohol with acetic anhydride and acid or salt of an acid catalyst, which has also been employed to make tertiary-butyl ester, does not yield high purity, high yield of the tertiary-amyl ester or free of acetyl chloride as a byproduct.

The tertiary-amyl acetate here of interest is made by reacting 1 mole to 1 mole ratio of acetic anhydride of

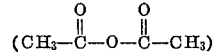

with tertiary-amyl alcohol ($CH_3$—$CH_2$—$C(CH_3)_2$—OH) under reflux with 0.01 mole percent HCl (38%) or less of alcohol used as a catalyst. The term "catalyst" in this disclosure is defined as providing an alternate route for the reaction and thus accelerating the desired reaction and making it go to completion. It is not important whether the catalyst actually enters into the reaction or not. The amount of the catalyst conc. HCl 38% (0.01 mole per mole percent) is extremely important in the preparation of the high purity, high yield products contemplated hereby. Tertiary esters of longer chains such as tertiary hexyl ($CH_3$—$CH_2$—$CH_2$—$C(CH_3)_2$)— or tertiary heptyl group ($CH_3$—$CH_2$—$CH_2$—$CH_2$—$C(CH_3)_2$) are prepared by reacting their corresponding alcohols with acetic anhydride in the presence of a small amount of conc. HCl (38%).

It has been determined experimentally that tertiary-amyl alcohol may be caused to react quantitatively with acetic anhydride to form an ester when a small amount of concentrated HCl (38%) is added to the mixture as the reaction-initiating catalyst and by using a very short reflux time of two to four hours.

Employing the general terms of R for an organic group of which alkyls are representative, the reaction involved is:

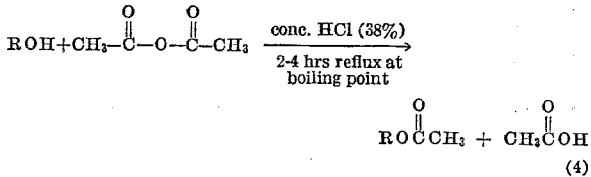
(4)

where R is the tertiary amyl group the reaction is:

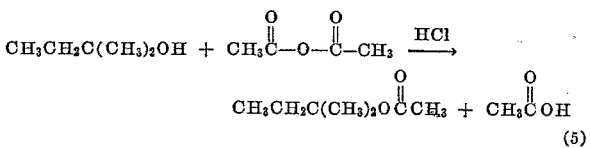
(5)

The action of conc. HCl (38%) is believed to be:

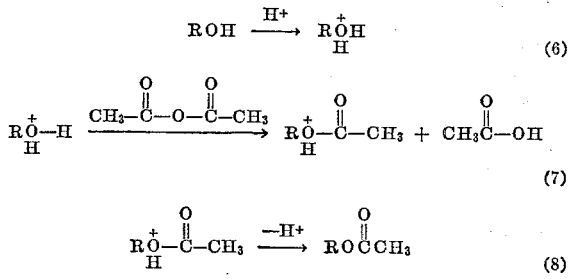

(6)

(7)

(8)

The amount of concentrated HCl (38%) that is used is 0.01 mole percent or less on the basis of the mole to mole ratio of the alcohol and acetic anhydride used in the reaction. If larger amounts of concentrated HCl (38%) are used a side reaction takes place to form either acetyl chloride and an impure product or formation of excess water which results in a hydrolysis of the ester to form alcohol and acid and results in a low yield of the ester.

The reaction to form acetyl chloride is:

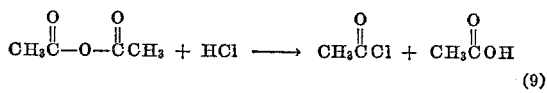
(9)

These reactions have been confirmed by infrared spectra, the analysis of the side reaction product, and the like.

When a stoichiometric amount of the HCl or any other proton donor acid is employed as catalyst using a reflux time of 2 to 4 hours or longer, the reaction of an acid with an alcohol to give an ester is reversible. The same equilibrium state can be reached starting with the products of the reaction, the ester and water which results in a hydrolysis reaction according to the following reactions:

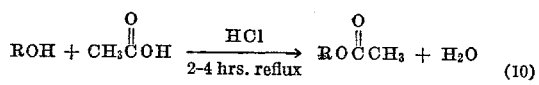
(10)

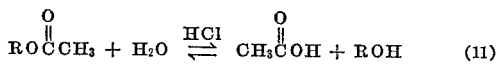
(11)

For the tertiary ester formation, the use of more H+ in the form of an acid than necessary produces a product that is contaminated with Cl such as in the case of HCl and side product of acetyl chloride or hydrolysis of the ester to the acid or alcohol and low yield. The use of larger amounts of HCl or longer reflux times to increase the yield of the product also results in the reaction of tertiary-amyl acetate with HCl to produce tertiary-amyl chloride and acetic acid. The reaction is either from the alcohol and anhydride reactants or from the ester product (R is the tertiary amyl group):

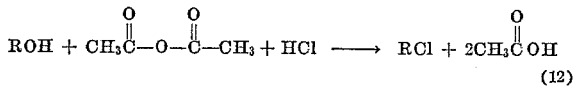
(12)

where R is the tertiary-amyl group, or from the ester product:

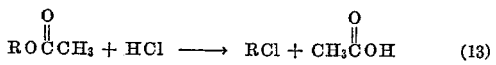
(13)

The rapid progress for making improved tertiary esters of which an illustrative example is tertiary-amyl acetate of a purity in the order gravimetrically of 99.99% in a yield in excess of 80% of the theoretical by the method of measuring out as reactants one mole of tertiary-amyl alcohol and one mole of acetic anhydride in a reflux condenser acidified with a minimum of concentrated HCl (38%) as catalyst and reflux the mixture under a pressure of about one atmosphere at a temperature between 110 to 112° C. for from 2 to 4 hours, transfer the refluxed solution to a distillation apparatus and distill over the fraction that boils under about one atmosphere of pressure at between 120 and 125° C., wash the 120 to 125° C. distillate fraction with 10% K$_2$CO$_3$, separate and dry about an 80% yield of tertiary-amyl acetate of boiling point 123° C. and of the composition C$_7$H$_{14}$O$_2$.

The purification of tertiary-amyl acetate distilled fraction between 120°–125° C. and so collected is accomplished by the following steps:

(1) The crude product (boiling point 120°–125° C.) was washed with 10% K$_2$CO$_3$ until neutral to litmus.

(2) Then it was dried over CaSO$_4$ and CaH$_2$.

(3) Fractional distillation over K metal resulted in an 80% yield of the tertiary-amyl acetate. Boiling point 123°–124° C.

*Analysis.*—Calcd. for C$_7$H$_{14}$O$_2$: C, 64.6; H, 10.8. Found: C, 64.6, 64.7; H, 10.9, 10.9.

Molecular weight (in benzene) 131, 137. (Theoretical 130.18 for monomer.)

No impurities were detachable by gas chromatography on a column using diethylene glycol succinate as the liquid phase. Spectral and physical property data listed below are consistent with the expected results, and are believed to be the best available for the compound.

The infrared spectra were obtained using a capillary film, NaCl and CsBr cells, and Perkin Elmer Model 521 and 221 Double Beam Spectrometers.

Tertiary-amyl acetate decomposed gradually above 125° C. to 2 - methyl - butene and acetic acid. Consequently close temperature control on distillation to avoid overheating is required.

Property data was obtained for tertiary-amyl acetate prepared by the described method. Some applicable literature values have been used for comparison. The data are given in Table I. The substantial variance in reported boiling point for the compound compared by different methods indicates considerable differences in purity favoring the process described herein. The nuclear magnetic resonance spectrum is consistent with the expected structure including a significant shift ($\Delta\delta$=0.52) where $\Delta\delta$ is the difference in chemical shift in p.p.m. for the methyl protons in the methyl group protons adjacent to the carbonyl groups. This agrees with the results reported for tertiary-butyl acetate for the methyl group adjacent to the carbonyl group. The infrared spectrum of this compound is given in FIGURES 1 and 2 for the region from 4000 cm.$^{-1}$ to 285 cm.$^{-1}$.

Two interchangeable units are used to describe a position in the infrared range of the electromagnetic spectrum. These are a wavelength ($\lambda$) unit, the micron ($\mu$), $1\mu = 10^{-4}$ cm. $= 10^4$ A.; and a so called frequency or wave number ($\nu$) unit, wave per cm., which is written cm.$^{-1}$. A simple reciprocal relationship exists between these units namely, $$\nu(\text{cm.}^{-1}) = \frac{1}{\lambda(\text{cm.})} = \frac{10^4}{\lambda(\mu)}$$

TABLE I

Some Properties of High Purity t-Amyl Acetate

| Property | This Method | Prior Method |
|---|---|---|
| Boiling Point, °C | 123–4 | 124. 124–124.5. 124–125. 123–124. 119–121. |
| Specific Gravity | 0.8725 at 24.7° C | 0.8738 at 19° C. |
| Refractive Index | 1.3969₇ at 24.5° C | 1.392 at 20° C. |

| NMR Data (TMS std.) | | | | |
|---|---|---|---|---|
| Chemical Shift, p.p.m | 0.85 | 1.80 | 1.38 | 1.90. |
| Peak Type | Triplet | Quadruplet | Singlet | Singlet. |
| No. Protons | 3 | 2 | 6 | 3. |
| Assignment | (a) | (b) | (c) | (d). |

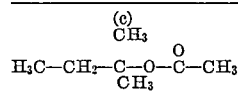

(a) (b) (c) (d)

In FIG. 1 the infrared spectrum of tertiary-amyl acetate is shown. The structural molecular arrangement is shown below the curve. The curve coordinates are presented along the ordinate in terms of percent light transmittance, and along the abscissa in terms below of frequency from 4000 to 200 reciprocal centimeters or cm.$^{-1}$ or 1/cm. and are linearly presented above the curve as from 2.5 to 40 microns wavelength.

In FIG. 2 the infrared spectrum curve of the product made by the process that is disclosed herein is shown along the ordinate as percent of light transmittance and along the abscissa below as wavelengths in microns from 15 to 40 that corresponds above with frequency in terms of reciprocal centimeters or cm.$^{-1}$ or 1/cm.

In the region from 4000 cm.$^{-1}$ to 700 cm.$^{-1}$ with reference to FIG. 1 the characteristic carbonyl stretch vibration for esters is found at 1733 cm.$^{-1}$. A methylene deformation vibration is observed at 1459 cm.$^{-1}$ typical of an acetate group. Routinely, consistent with previous results, the 1157 cm.$^{-1}$ band would be assigned to a C—O stretch vibration. It has been found, however, that this is a difficult assignment to make unequivocally. Recent work with transition metal alkoxide compounds, in which the C—O stretch has been influenced by the attached heavy metal, has shown that the C—O stretch vibration is near 1000 cm.$^{-1}$ for tertiary alcohols. The C—C stretch vibration intensity has been found stronger than the C—O stretch vibration in this region. Based on these results and a consideration of alkane spectra in general the 1018 cm.$^{-1}$ peak is assigned to the C—O vibration and the 1255 cm.$^{-1}$, 1202 cm.$^{-1}$, 1157 cm.$^{-1}$, 1059 cm.$^{-1}$, 948 cm.$^{-1}$, and 829 cm.$^{-1}$ absorptions arise from skeletal vibrations of the tertiary-amyl group.

The characterization of saturated aliphatic esters is facilitated by use of the medium infrared spectra from 650 cm.$^{-1}$ to 285 cm.$^{-1}$ with reference to FIG. 2. The strong band at 610 cm.$^{-1}$ is characteristic of acetates of secondary and tertiary alcohols, as is the 615 cm.$^{-1}$ band which is stronger for tertiary-butyl acetate and other lower molecular weight acetates. The 510 cm.$^{-1}$ peak is a skeletal vibration found for esters where at least 3 carbon atoms are in a straight chain attached to the acetate (e.g., n-propyl, n-butyl, isobutyl, neo-pentyl, etc.).

The 466 cm.$^{-1}$, 352 cm.$^{-1}$, and 337 cm.$^{-1}$ are characteristic of esters of tertiary alcohols and the 327 cm.$^{-1}$ band is found for all tertiary acetates.

It is to be understood that modifications may be made in the apparatus and in the process that are disclosed herein, within the limits of equivalent chemical practices for the attainment of comparable results, without departing from the spirit and the scope of the present invention as defined by the appended claims.

We claim:

1. The method for making high purity tertiary-amyl acetate in a yield in excess of 80% comprising the steps of reacting equimolar amounts of tertiary-amyl alcohol and acetic anhydride in the presence of 38% hydrochloric acid as a catalyst in the amount of 0.01% by weight of the tertiary-amyl alcohol used, refluxing the mixture for from two to four hours at a temperature between 100 and 110° C. and recovering the refluxed product of tertiary-amyl acetate by fractional distillation.

2. The process of claim 1 wherein the fractional distillation step comprises recovering the portion of the refluxed product of tertiary-amyl acetate which distills at 120 to 125° C. and then redistilling to recover the portion which distills at 123 to 124° C.

3. The process of claim 2 wherein the portion of the refluxed product of tertiary-amyl acetate which distills at 120 to 125° C. is washed with 10% $K_2CO_3$ and then redistilled to recover the portion which distills at 123 to 124° C.

References Cited

UNITED STATES PATENTS 2,685,598   8/1954   Caldwell _____ 260—488

OTHER REFERENCES

Chem. Astracts I (1934), 28:102.
Chem. Abstracts II (1939) 33:7731.
Royals, Adv. Org. Chem. (1954), p. 233.

LORRAINE A. WEINBERGER, Primary Examiner

V. GARNER, Assistant Examiner